United States Patent [19]
Shultz

[11] Patent Number: 5,417,300
[45] Date of Patent: May 23, 1995

[54] COMPACT STACKABLE VEHICLE

[76] Inventor: Richard E. Shultz, 6835 Old Quarry La., Austin, Tex. 78731

[21] Appl. No.: 122,314

[22] Filed: Sep. 16, 1993

Related U.S. Application Data

[63] Continuation of Ser. No. 721,981, Jun. 27, 1991, abandoned.

[51] Int. Cl.⁶ .................. B62D 61/06; B62D 21/00; B62D 39/00; B60R 19/38
[52] U.S. Cl. .................. 180/208; 180/210; 180/65.1; 280/33.991; 293/118
[58] Field of Search ............ 180/208, 210, 211, 214, 180/311, 198, 14.1, 65.1; 280/33.991, 33.996, 33.997, 33.998, 62, DIG. 5; 414/722; 293/118, 145, 105

[56] References Cited

U.S. PATENT DOCUMENTS

| | | | |
|---|---|---|---|
| 2,916,291 | 12/1952 | Young | 280/33.991 |
| 3,194,346 | 7/1965 | Stentz et al. | 293/118 |
| 3,431,662 | 3/1969 | Bles | 414/722 X |
| 3,580,348 | 5/1971 | Rosario Di Biasi | 180/208 |
| 3,589,745 | 6/1971 | Dougherty | 280/639 |
| 3,719,244 | 3/1973 | Miller et al. | 180/14.1 |
| 3,850,472 | 11/1974 | Greppi | 180/208 |
| 3,937,147 | 2/1976 | Szent-Miklosy, Jr. | 280/33.991 |
| 4,089,542 | 5/1978 | Westerman | 280/639 |
| 4,171,730 | 10/1979 | Dow | 180/210 |
| 4,309,142 | 1/1982 | Shumaker | 414/722 |
| 4,340,124 | 7/1982 | Leonard | 180/208 |
| 5,082,082 | 1/1992 | Hvolka | 180/311 X |

FOREIGN PATENT DOCUMENTS 1158632  6/1958  France ................ 280/33.998

Primary Examiner—Margaret A. Focarino
Assistant Examiner—Peter C. English
Attorney, Agent, or Firm—Clark, Thomas & Winters

[57] ABSTRACT

A nesting passenger vehicle designed to improve access to subways and commuter trains by virtue of its reduced parking area requirements. A short cabin and a V shaped frame permit the vehicle to nest or horizontally stack into other vehicles of the same shape in a manner that requires a small amount of parking space per vehicle. The present invention provides a significant parking density advantage compared to conventional, privately owned automobiles.

17 Claims, 6 Drawing Sheets

COMPACT STACKABLE VEHICLE

This application is a continuation of application Ser. No. 07/721,981, filed Jun. 27, 1991, abandoned

FIELD OF THE INVENTION

The present invention relates generally to the field of transportation systems. More specifically, the present invention provides a horizontal stacking car which requires much less parking area than would normally be required for a car having the same length and width.

BACKGROUND

Over half of the area in a conventional parking lot is used for accessing cars in random order. Each owner wants to be able to have access to his or her car at any given time, regardless of where it is in the lot. Many parking lots are managed by closely spacing the cars, thus restricting access to cars in the interior of the group. Such an arrangement typically results in a doubling of the utilization of the lot. Nonetheless, even with such management techniques, parking space remains at a premium in many heavily congested urban areas.

There is a need for an automobile which is capable of maximizing the storage space available on a parking lot. More specifically, there is a need for an automobile having two important features: 1) the length of a conventional car for safety and 2) a short effective length for parking density. The automobile of the present invention, discussed in greater detail below, has both features but avoids the complexity and cost of the designs in prior art.

SUMMARY OF THE INVENTION

The invention, in the preferred embodiment, provides an automobile which is capable of being stored With a significant decrease in the amount of required storage space, thus providing a significant increase in the amount of storage density. The preferred embodiment of the invention provides a vehicle having a short upper body and V shaped lower body (chassis).

The compact automobile of the present invention provides a long car for operation and a short car for storage. It does so without reconfiguration of the cabin or chassis. When configured for use, the car provides several feet of impact absorbing metal structure in front of the driver. This structure absorbs the energy of a frontal collision in a manner that minimizes forces felt by the occupant.

The invention, in the preferred embodiment, consists mainly of an upper body and lower body, the two being divided by an imaginary, substantially horizontal plane. The upper body consists mainly of a short, wide cabin with sufficient room for three occupants sitting abreast. The lower body is two to three times longer then the upper body. Attached to the lower body are three or four wheels. The lower body has a V shape when viewed from above. The V shape allows the lower body to nest with other lower bodies such that each vehicle added to a horizontal stack of vehicles adds a length increment equal to one third the vehicle length. For example, if the total vehicle length were 12 feet, each vehicle driving into the stack would add only four feet.

An optional feature comprises two pivotally mounted bumpers. The bumpers are stowed above the cabin and rotated downward for vehicle operation. The front bumper connects the lower body front ends to strengthen the vehicle. The rear bumper provides protection for the cabin and has mounted to it a pair of idler wheels. These idler wheels assist the one rear wheel in providing stability.

The compact automobile of the present invention offers numerous advantages over the prior art. It is safer because the lower body projects both in front of and behind the upper body. Projections provide impact absorbing structure to protect occupants. It is simpler as the cabin and chassis do not collapse for compactness. Nor does the cabin have to be invaded. It is stronger since the cabin and chassis structural elements do not have to rotate or slide for a collapsing action. All of these advantages are achievable with the simple measure of elevating the cabin completely above the chassis. A cabin which sits completely above the frame allows the frame to receive substantial portions of other vehicle chassis from both the front and rear. The V shaped chassis is capable of nesting two thirds of its chassis length in a vehicle behind it and is capable of receiving two thirds the chassis length of a vehicle in front of it.

BRIEF DESCRIPTION OF THE DRAWINGS

Further advantages and a more complete understanding of the invention can be obtained by referring to the following detailed description of specific embodiments when taken in conjunction with the accompanying drawings in which.

DETAILED DESCRIPTION OF THE PREFERRED EMBODIMENT

Figure 1:
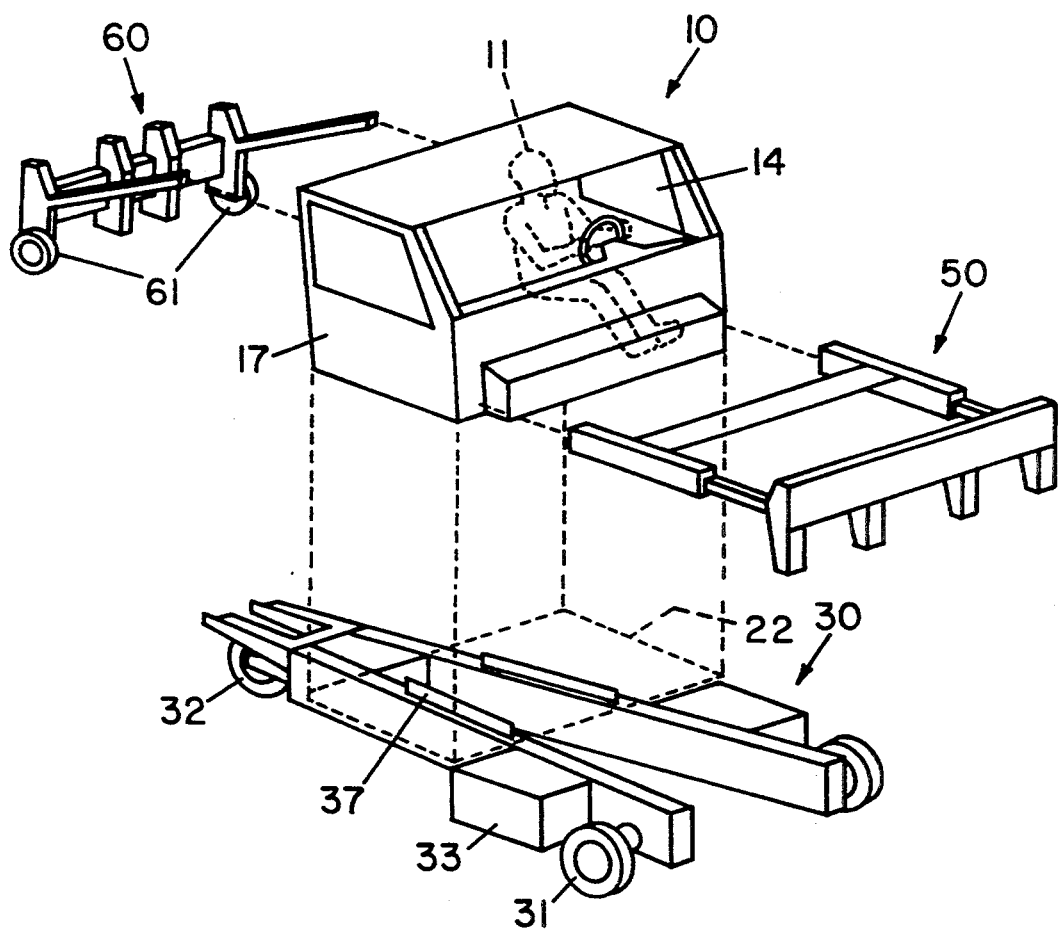
FIG. 1 is an exploded perspective view of the compact stackable vehicle of the present invention in the operative condition with the bumpers in the lowered position.

FIG. 1 shows an exploded view of the vehicle comprising an upper body 10, lower body 30, front bumper 50, and rear bumper 60. The upper body 10 is primarily a driver and passenger cabin with a windshield 14 and doors 17. The outline of the upper body floor plate 22 is shown superimposed on lower body 30. Upper body 10 is connected to lower body 30 with standoffs 37. The lower body has attached to it front wheels 31 that steer and a rear wheel 32 that is powered. Box-like battery compartments 33 are attached behind the wheels. Attached by pivots are bumpers 50 and 60. The front bumper 50 is attached, to the lower front of the upper body 10. Rear bumper 60 is attached to the upper body 10, half way up the back. Rear bumper 60 has two idler wheels 61.

Figure 2:
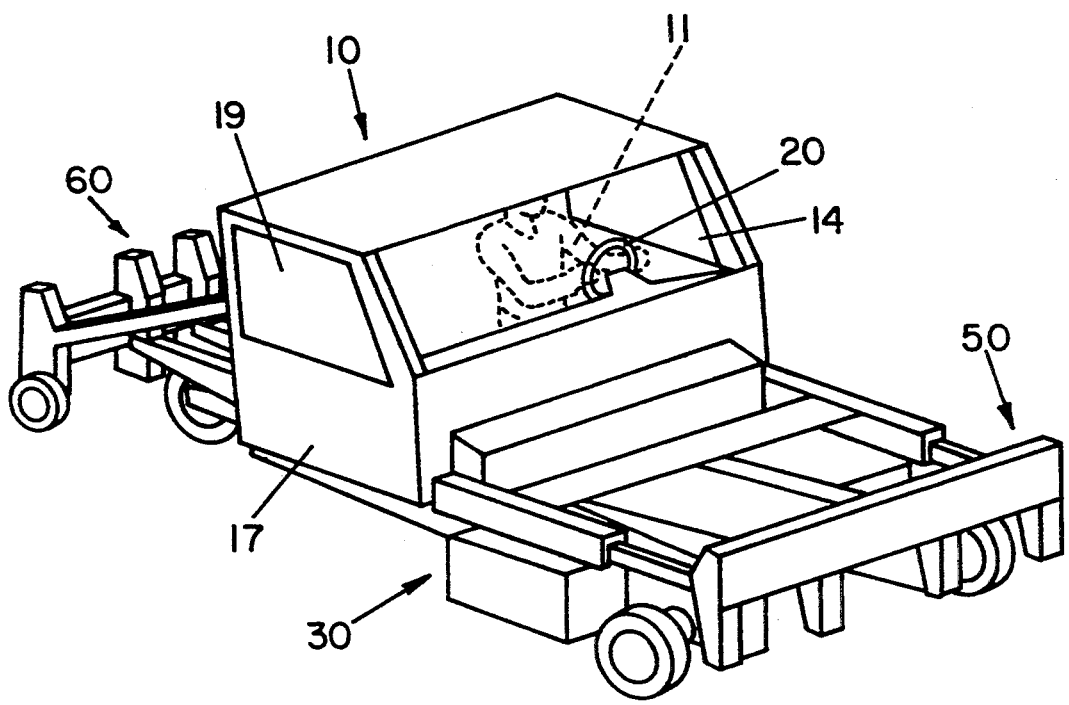
FIG. 2 is a perspective view of an assembled compact storable automobile in accordance with the present invention with the bumpers in the lowered position.

FIG. 2 shows the assembled vehicle in perspective view. A single occupant 11 is shown, in phantom lines, in the driver's seat, holding steering wheel 20. The upper front of upper body 10 has a windshield 14. On upper body sides are doors 17 with windows 19. Upper body 10 sits in the middle of lower body 30. In operative configuration front bumper 50 and rear bumper 60 are connected to both the upper and lower bodies.

Figure 3:
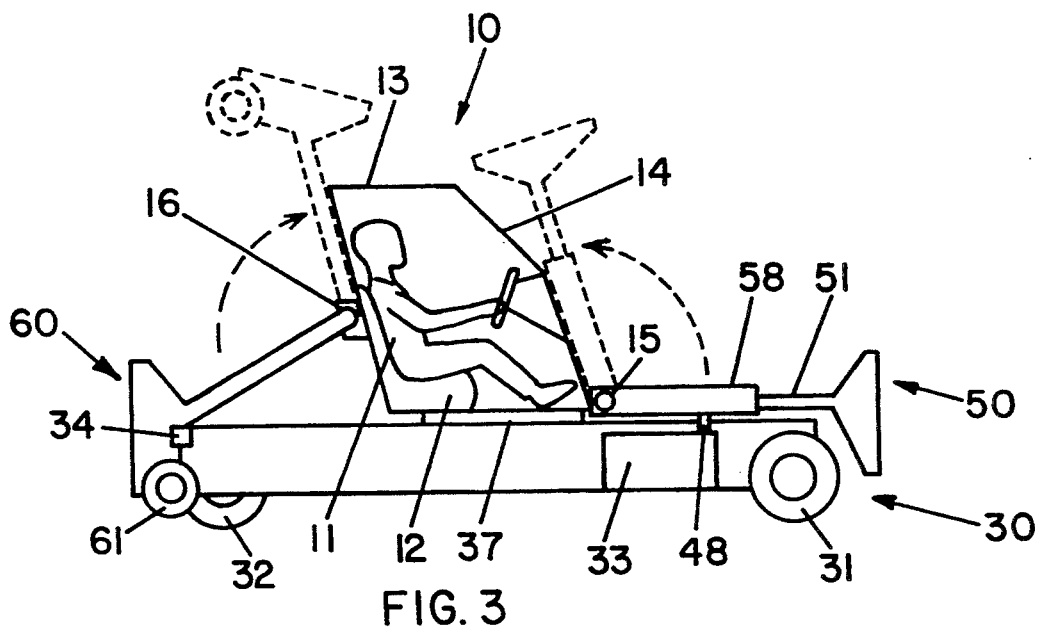
FIG. 3 is a side view of the compact storable automobile of the present invention with the bumpers in the lowered position. This view also shows raised bumpers in dashed lines.

FIG. 3 shows a side view of the compact automobile of the present invention with the side doors removed and one or more occupants 11 seated abreast on a bench seat 12. The upper body 10 consists mainly of a short cabin which is shown in outline 13. Also shown are front bumper 50 and rear bumper 60 both attached to the cabin. Front bumper 50 is pivotally connected to upper body by shaft 15. Shaft 15 is turned by an operator controlled, powered means not shown. When in the lowered position, the front bumper is latched to lower body 30 by latches 48. Rear bumper 60 is pivotally connected to the back of upper body 10 by shaft 16. Shaft 16 is driven by operator controlled, powered means not shown. Rear bumper 60 is latched to lower body 30 by latches 34. Bumpers 50 and 60 shown in solid lines are configured for driving. Bumpers 50 and 60 shown in dashed lines have been raised for parking. Front bumper 50 includes beams composed of long arms 58 and short arms 51. In the event of a frontal collision the force will be absorbed by these arms. Short arm 51 will telescope into long arm 58. Energy will be absorbed by permanent deformation of arm 58 inner liner. Rear Bumper 60 has two idler wheels 61. Lower body 30 has front wheels 31, rear wheel 32, and battery compartments 33. Standoffs 37 connect lower body 30 to upper body 10 and elevate upper body 10 a few inches above lower body 30.

Figure 4A:
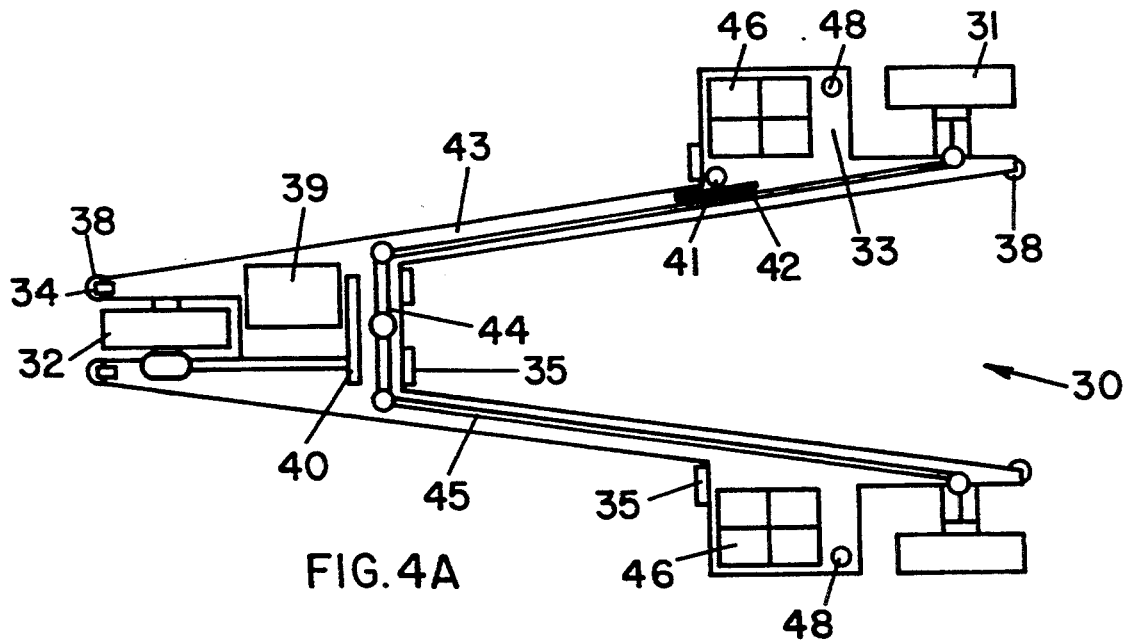
FIG. 4A is a plan view of lower body of the compact storable automobile of the present invention.

FIG. 4A shows a plan view of lower body 30. Note the V shape which permits compact parking. The inside of the V is a concavity facing forward. The outside of the V is a convexity facing to the rear. Both the concavity's depth and the convexity's length are two thirds the lower body length. The concavity of any vehicle is shaped to receive the convexity of any other. Docking rollers 38 are located at both ends and both sides of lower body 30. Rubber docking blocks 35 are located in the back of the concavity and on the back sides of battery compartments 33. Rollers 38 reduce friction in case of misalignment during docking. Docking blocks 35 absorb impact when lower bodies contact. Motor 39 transmits power through drivetrain 40 to rear wheel 32. Battery packs 46 are behind front wheels 31. Steering wheels 31 are connected to the steering column pinion gear 41 by a linkage. Pinion 41 drives rack 42 which is connected to left link 43. Left link 43 is connected to left front wheel 31 and to pivot arm 44 which is in turn connected to right link 45. Right link 45 is connected to the fight front wheel 31. Front latching means 48 are shown on the forward outer corners of battery compartments 33. Rear latches 34 are on the back end.

Figure 4B:
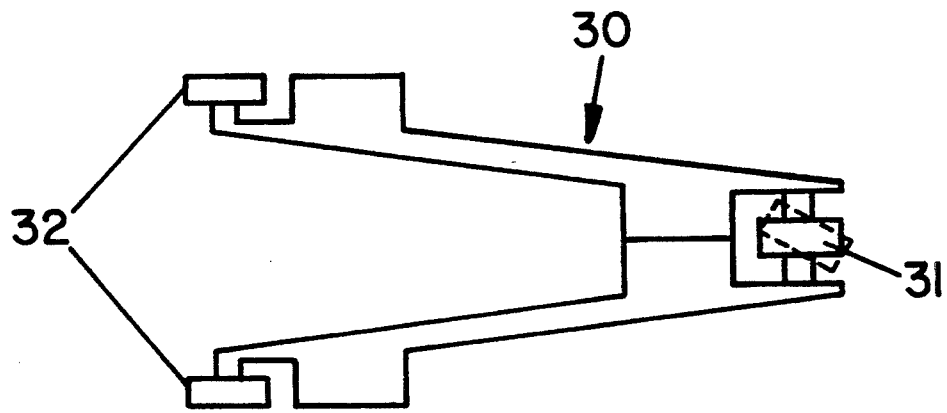
FIGS. 4B, 4C, 4D illustrate alternate embodiments of lower body shapes and wheel arrangements for the compact storable automobile of the present invention.
Figure 4C:
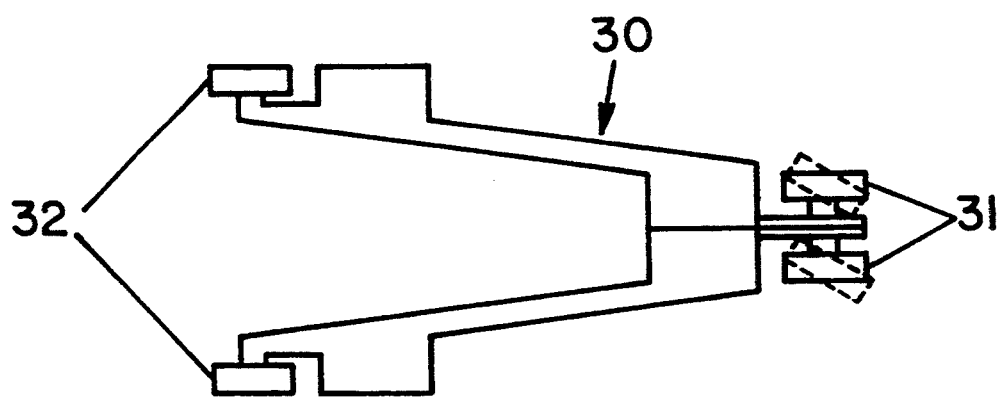
Figure 4D:
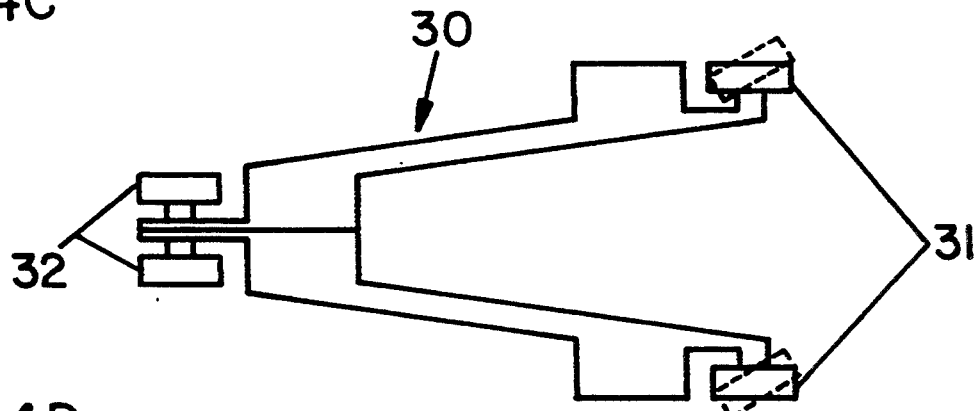

FIGS. 4B, 4C and 4D shows alternative wheel and frame arrangements for the lower body. In FIG. 4B the vehicle has one front wheel 31 and a narrow front end facing to the :right. The rear end is wide and has two rear wheels 32. This configuration could have the two rear wheels driven or just the front or all three. FIG. 4C shows two front wheels 31 mounted on a narrow front end. Two widely spaced rear wheels 32 are shown. For FIGS. 4B and C show configurations where the direction of the V frame is opposite that of the preferred embodiment. FIG. 4D shows a V frame wide in front, as with the preferred embodiment. Two rear wheels 32 are closely spaced. Two front wheels 31 are widely spaced. In all of these arrangements it would be possible to drive with the rear wheel or wheels or with the front wheel or wheels or with all wheels.

Figure 5A:
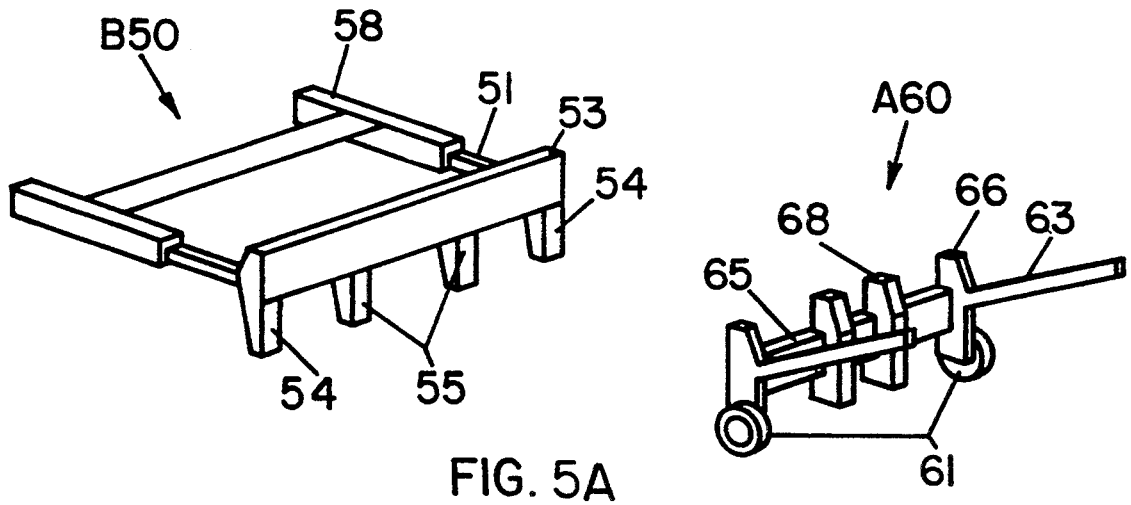
FIG. 5A is a perspective view of the bumpers of the compact storable automobile of the present invention with the bumpers lowered.

FIG. 5A shows, in lowered position, the front bumper B50 of car B (not shown). In front of car B is car A (not shown). Car A has rear bumper A60. Front bumper B50 has two beams composed of short arms 51 and long arms 58. The outer ends of short arms 51 are connected by cross piece 53. Left and fight outer fines 54 are mounted to cross piece 53. Left and fight inner tines 55 are also mounted to said crosspiece. Rear bumper A60 has crosspiece 65 to which are mounted outer tines 66, inner tines 68, arms 63 and idler wheels 61.

Figure 5B:
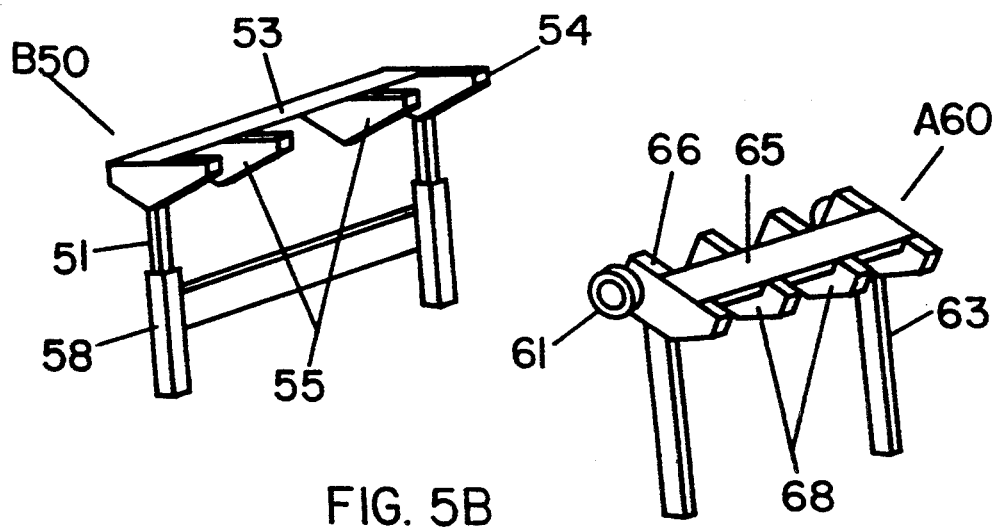
FIG. 5B is a perspective view of the bumpers of the compact storable automobile of the present invention with the bumpers raised.

FIG. 5B shows front bumper B50 and rear bumper A60 raised for stacking. Front bumper B50 is rotated counterclockwise 100 degrees about the back end of arms 58. Arms 58 and 51 are vertical. Tines 54 and 55 are close to horizontal. Rear bumper A60 was rotated clockwise by 120 degrees about the forward ends of arms 63. This puts tines 66, 68, idler wheels 61 and crosspiece 65 above the cabin of car A.

Figure 5C:
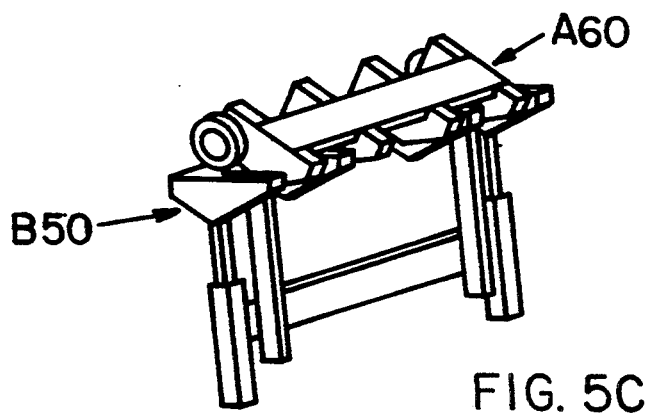
FIG. 5C is a perspective view of the bumpers of the compact storable automobile of the present invention with the bumpers raised and interleaved

FIG. 5C shows that as car B drives forward to stack with car A, the front bumper B50 interleaves with rear bumper A60.

Figure 6:
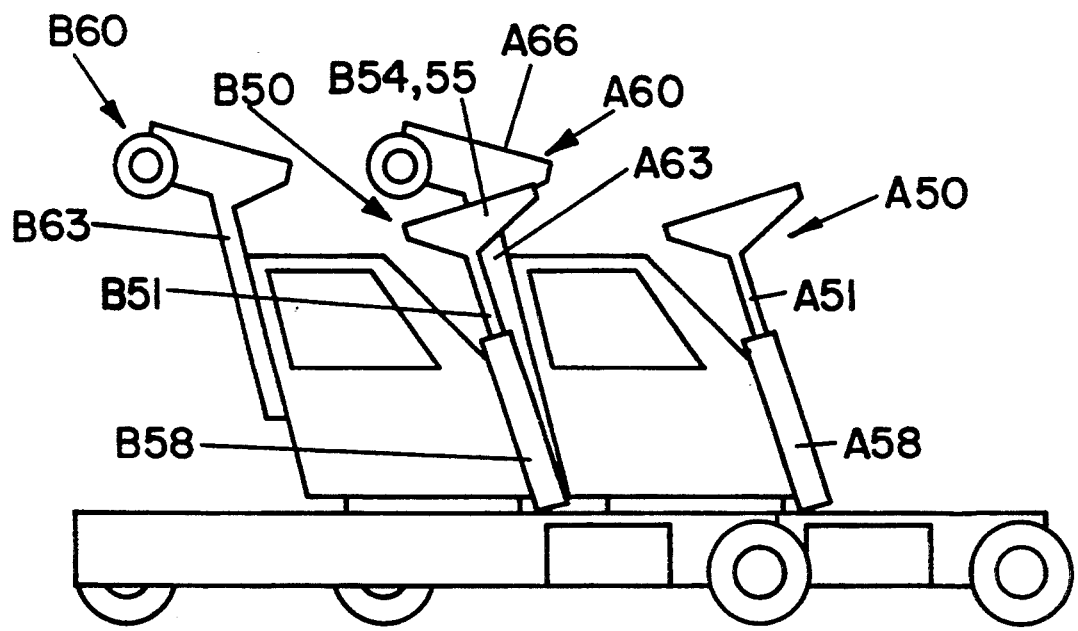
FIG. 6 is a side view of two cars nested with detail of bumper interleave.

FIG. 6 shows a side view of two cars with car B behind car A. Note that front bumper B50 interleaves with rear bumper A60 when bumpers are raised and vehicles parked. Outer tines B54 and inner tines B55 of front bumper pass on either side of arms A63 of a rear bumper A60. Beams composed of arms B58, 51 are more widely spaced and so sit outside of arms A63.

Figure 7:
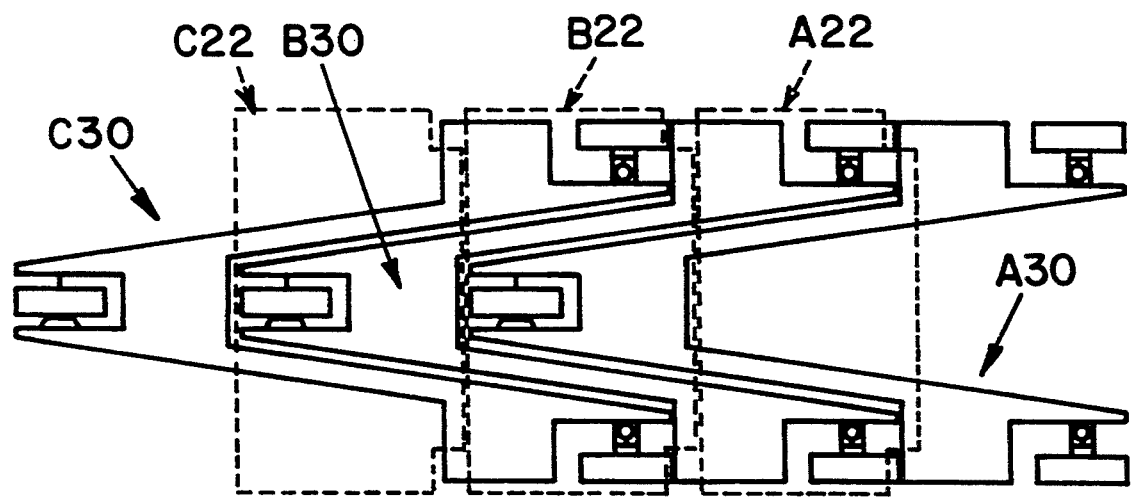
FIG. 7 is a plan view of three lower bodies nested into each other.

FIG. 7 shows, in plan view, how three lower bodies A30, B30, C30 would nest together. Upper bodies are not shown, except that the position of upper body floor plates A22, B22, C22 are shown in phantom lines. The length of the horizontal stack is increased by only four feet for every twelve foot lower body added to it. Floor plate B22 sits above the rear portion of A30 and the front portions of C30. B22 is only attached to lower body B30.

Figure 8:
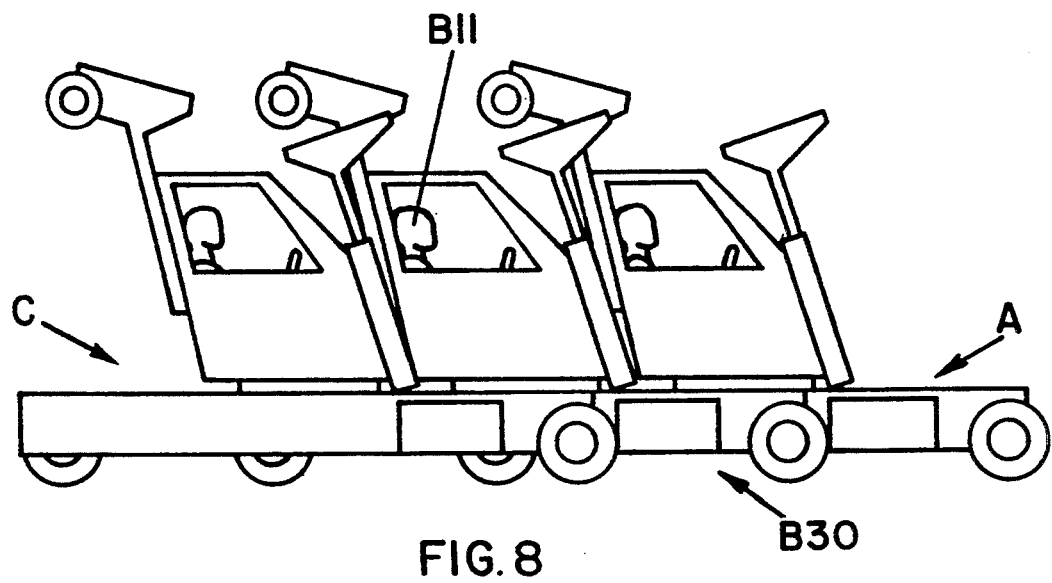
FIG. 8 is a side view of three complete vehicles nested together.

FIG. 8 shows a side view of three complete vehicles A, B, C nested together. Bumpers are in the raised position to allow this compact form of parking. In practice a horizontal stack would be up to forty vehicles long. An occupant 11 is able to get out of car B even after it is sandwiched in between cars A and C.

Figure 9:
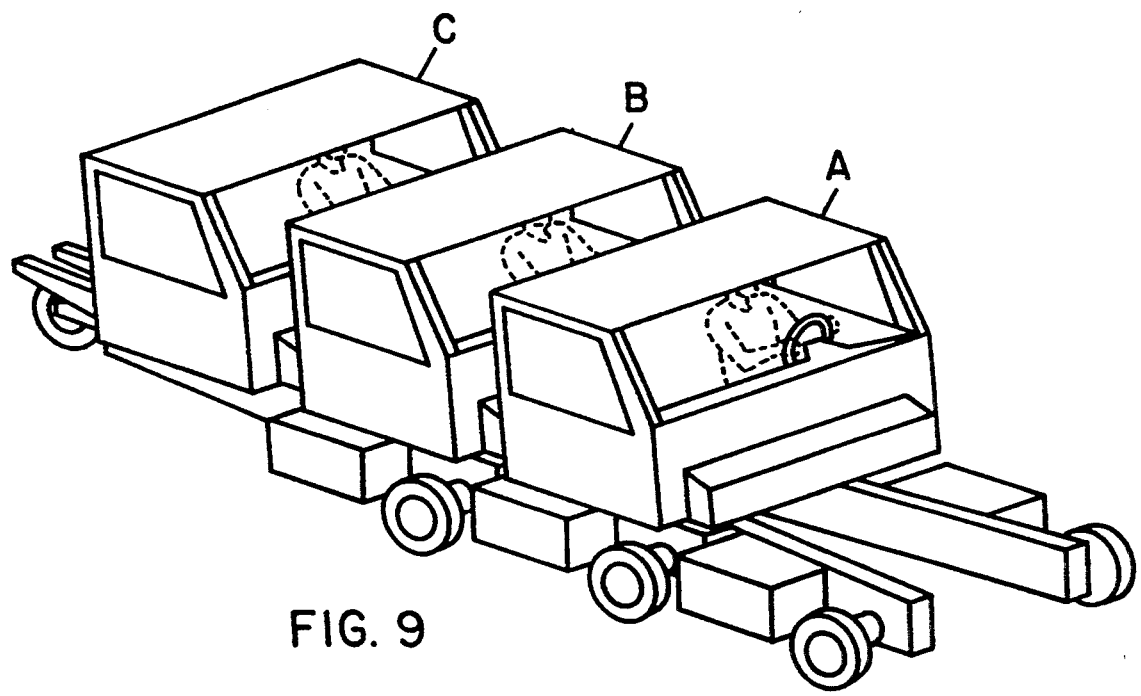
FIG. 9 is a perspective view of three cars nested together, with the bumpers not shown.

FIG. 9 shows three cars A, B, C in perspective. They are parked together in a stack. Bumpers are not shown.

The user drives the car out of a stack and then stops to lower bumpers 50, 60 by a motorized means. A remotely actuated locking means 48 firmly attaches front bumper 50 to lower body 30 at the top of battery compartment 33. Rear bumper 60 locks, in similar fashion, onto lower body frame ends with latches 34 at bumper inner tines 68. (see FIGS. 3, 4A and 5)

To park the car into a stack the user must unlatch bumpers, raise them and dock the lower body. Latches 34 and 48 are remotely actuated to release bumpers, such that the driver need not get out of the car. The driver also raises the bumpers by remotely actuated, powered means turning shafts 15 and 16 (FIGS. 3, 4A, and 5).

The bumpers have tines 54, 55 and 66, 68 that interleave, as would two forks, during the docking process. (FIGS. 5c and 6). Docking misalignment could cause the approaching lower body to jam against the fixed lower body, much as a drawer sticks on insertion. Docking rollers 38 prevent lower body frame ends from sticking or scraping as they contact and slide along the surface of another lower body. Rubber docking blocks 35 absorb impact of docking and provide wear resistant contact points between lower bodies.

As illustrated in FIGS. 7, 8 and 9 the car is capable of parking compactly when grouped with several other cars of the same shape. As with grocery carts, compactness is not achieved for an individual car, but instead for a group. In FIGS. 7, 8 and 9 three cars, A, B, and C are stacked together. Car A parked first. Car B drove up from behind, raised bumpers and then drove forward so that lower body B30 concavity docked with lower body A30 convexity. The docking is a loose fit between matched forward and rearward surfaces. Upper body B10 travels over the rearward part of lower body A30. Forward parts of lower body B30 travel under upper body A10. Standoffs 37 (FIG. 1, 3) insure that lower and upper bodies do not collide. These cars have springs in the suspension, and may have different loads, such that lower bodies A30, B30 and C30 will all have different heights. The standoffs 37 insure that even though A30 might be higher than B30 due to a light load, cabin B10 will still be higher than the rear portion of lower body A30.

Car C parks behind car B. Concavity of lower body C30 docks with convexity of lower body B30. Upper body C10 comes to rest immediately behind upper body B10. Rubber blocks 35 (FIG. 4A) absorb impact and provide wear resistant contact points between cars. Friction reducing means 38 (FIG. 4A), such as rollers with vertical axes or Teflon strips, promote smooth relative motion between lower bodies in the event that alignment is inaccurate during docking.

The cabins in upper bodies A10, B10 and C10 are not compacted or invaded, during parking, so that the occupant of car B is not threatened by car C parking behind him. Side doors of B10 are not covered or hindered by C10 immediately behind or A10 in front. Hence the occupant of B10 can enter or exit the car even though sandwiched in between cars A and C.

When configured for use the car has front and rear bumpers 50, 60 that provide crash protection. The front bumper beams are composed of short arms 51 and long arms 58. Short arms 51 telescope into long arms 58 in an energy absorbing manner. Rear bumper 60 has idler wheels 61 spaced about 5 feet apart. These provide support in case the vehicle starts to tip over. Rear latches 34 insure that loading of wheels 61 will not pivot rear bumper 60. (FIGS. 3, 4, 5)

The linkage composed of links 43, 45 and pivot arm 44 connect the two front wheels for coordinated steering. Pinion 41, on the lower end of the steering column, drives rack 42 connected to link 43. (FIG. 4A)

A car's side doors 17 (FIGS. 1 and 2) are not obstructed by a car immediately behind it, or in front of it. The upper body 10 does not have to compact during parking, nor is it invaded as with a grocery cart cargo basket.

Unlike the prior art this car design achieves a high parking density without requiring relative motion between major parts of a vehicle. The car's bumpers 50, 60 do have to rotate but these are minor parts compared to the upper and lower bodies 10, 30 (FIG. 1, 2). The advantages of a solid upper and lower body are simpler construction, lower cost, ease of use, and increased strength. Although the car parks compactly, the passenger cabin is roomy for three occupants. The car design achieves a high parking density first by being a rental and second by having a short cabin and a nesting lower body. Despite a six fold parking density increase compared to conventional cars, the car still has a solid roomy cabin and adequate length to provide as much crash protection as available with a typical compact car. The cabin is not compacted or invaded, as with shopping carts, so that the occupant of a first vehicle is not threatened by a second vehicle parking behind him. Side doors are not covered or hindered by other vehicles immediately behind or in front of vehicle. Hence a user can enter or exit a car which is in the middle of a stack.

While the foregoing discussion of the invention contains many specific details, these should not be construed as limiting the scope of the invention, but rather as merely providing illustrations of exemplary embodiments of the invention. Many other variations and modifications of the invention will be apparent to those of skill in the art without departing from the spirit and the scope of the invention as defined by the appended claims and their equivalents.

What is claimed is:

1. A plurality of nesting vehicles capable of being parked in a compact configuration by having the vehicles nest with one another, each vehicle comprising:
   a passenger compartment;
   means defining a vehicle chassis with said passenger compartment carried thereon, a first end of said chassis comprising a void and a second end of the chassis comprising a void-conforming portion;
   a first bumper means, said first bumper means being rotatably attached to said vehicle and being rotatable between a raised position and a lowered position, said bumper means closing said void when in said lowered position to protect said passenger compartment in a collision;
   a plurality of wheels rotatably attached to said vehicle chassis;
   means for steering at least one of said plurality of wheels; and
   propulsion means for propelling said vehicle;
   whereby when the plurality of nesting vehicles are nested, a void-conforming portion of a first one of the plurality of nesting vehicles is inserted into and substantially fills the void of a second one of the plurality of nesting vehicles, and the void-conforming portion of the second one is inserted into and substantially fills the void of any other of the plurality of nesting vehicles, each of the plurality of nesting vehicles being interchangeable with each other.

2. The vehicles according to claim 1, each vehicle further comprising a second bumper means, said second bumper means being rotatably attached to said vehicle and being rotatable between a raised position and a lowered position.

3. The vehicles according to claim 2, said chassis of each vehicle comprising two chassis members attached to form a generally V-shaped chassis, said void in said chassis being defined by the space between said two chassis members.

4. The vehicles according to claim 3, each of said first and second bumper means comprising a generally planar member attached to said vehicle by at least one arm.

5. The vehicles according to claim 4, each of said bumper means comprising a plurality of tines depending from said planar member.

6. The vehicles according to claim 5, said tines on said planar members of each of said first and second bumper means being arranged to interleave with complementary tines carried on the bumper means of another vehicle when said bumper means are in the raised position.

7. The vehicles according to claim 6 at least one of said bumper means of each vehicle having a plurality of idler wheels to provide support for said bumper means when in the lowered position.

8. The vehicles according to claim 6, said propulsion means of each vehicle comprising at least one electric motor operably coupled to at least one of said plurality of wheels.

9. A plurality of nesting vehicles capable of being parked in a compact configuration by having the vehicles nest with one another, each vehicle comprising:
a passenger compartment;
a vehicle chassis defined by two elongate chassis members attached in a generally v-shaped configuration with a void being defined by the space between said chassis members at a first end and a void-conforming portion being defined by said elongate members at a second end, said passenger compartment being mounted on the vehicle chassis, and located above said void;
a first bumper means, said first bumper means being rotatably attached to said vehicle and being rotatable between a raised position and a lowered position, said first bumper means closing said void when in said lowered position to protect said passenger compartment in a collision;
a plurality of wheels rotatably attached to said vehicle chassis;
means for steering at least one of said plurality of wheels; and
propulsion means for propelling said vehicle;
whereby when the plurality of nesting vehicles are nested, a void-conforming portion of a first one of the plurality of nesting vehicles is inserted into and substantially fills the void of a second one of the plurality of nesting vehicles and the void-conforming portion of the second one is inserted into and substantially fills the void of any other of the plurality of nesting vehicles, each of the plurality of nesting vehicles being interchangeable with each other.

10. The vehicles according to claim 9, each vehicle further comprising a second bumper means, said second bumper means being rotatably attached to said vehicle and being rotatable between a raised position and a lowered position.

11. The vehicles according to claim 10, each of said first and second bumper means comprising a generally planar member attached to said vehicle by at least one arm.

12. The vehicles according to claim 11, each of said bumper means comprising a plurality of tines depending from said planar member.

13. The vehicles according to claim 12, said tines on said planar members of each of said first and second bumper means being arranged to interleave with complementary tines carried on the bumper means of another vehicle when said bumper means are in the raised position.

14. The vehicles according to claim 13, at least one of said bumper means of each vehicle having a plurality of idler wheels to provide support for said bumper means when in the lowered position.

15. The vehicles according to claim 14, said propulsion means of each vehicle comprising at least one electric motor operably coupled to at least one of said plurality of wheels.

16. A plurality of nesting vehicles of approximately the same size and shape, capable of being parked in a compact configuration by having the vehicles nest with one another, each vehicle comprising:
a passenger compartment;
a vehicle chassis connected to the passenger compartment, a first end of the chassis comprising a void, and a second end of the chassis comprising a void-conforming portion;
a plurality of wheels rotatably attached to the vehicle chassis;
means for steering at least one of the plurality of wheels; and
propulsion means for propelling the vehicle;
whereby when the plurality of nesting vehicles are nested, a single void-conforming portion of a first one of the plurality of nesting vehicles is inserted into and substantially fills the void of a second one of the plurality of nesting vehicles, and the void-conforming portion of the second one is inserted into and substantially fills the void of any other of the plurality of vehicles, each of the plurality of nesting vehicles being interchangeable with each other and the plurality of wheels on each of the nesting vehicles remaining on substantially the same plane.

17. A plurality of nesting vehicles of approximately the same size and shape capable of being parked in a compact configuration by having the vehicles nest with one another, each vehicle comprising:
a passenger compartment;
a vehicle chassis, connected to the passenger compartment, defined by two elongate chassis members attached in a generally v-shaped configuration with a void being defined by the space between the chassis members at a first end of the vehicle chassis, with the passenger compartment being located above the void, and a void-conforming portion at a second end of the vehicle chassis being defined by the outer edges of the generally v-shaped configuration;
a plurality of wheels rotatably attached to the vehicle chassis;
means for steering at least one of the plurality of wheels; and
propulsion means for propelling the vehicle;
whereby when the plurality of nesting vehicles are nested, a void-conforming portion of a first one of the plurality of nesting vehicles is inserted below the passenger compartment and into and substantially filling the void of a second one of the plurality of vehicles, and only the void-conforming portion of the second one is inserted into and substantially fills the void of any other of the plurality of nesting vehicles, each of the plurality of nesting vehicles being interchangeable with each other.

* * * * *